(12) United States Patent
Al-Saleh et al.

(10) Patent No.: US 11,662,230 B2
(45) Date of Patent: May 30, 2023

(54) RECORDER FOR SHAFT ROTATION VERIFICATION

(71) Applicant: Saudi Arabian Oil Company, Dhahran (SA)

(72) Inventors: Mansour Mohammed Al-Saleh, Al-Qara (SA); Qasem A. Fandem, Qatif (SA); Khalid H. Al-Mutawa, Khober (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 323 days.

(21) Appl. No.: 16/866,301

(22) Filed: May 4, 2020

(65) Prior Publication Data

US 2021/0341315 A1    Nov. 4, 2021

(51) Int. Cl.
    *G01D 5/39*    (2006.01)
    *G01M 1/14*    (2006.01)
(52) U.S. Cl.
    CPC ................ *G01D 5/39* (2013.01); *G01M 1/14* (2013.01)
(58) Field of Classification Search
    CPC .......... G01D 5/39; G01D 5/145; G01D 5/347; G01D 2205/22; G01M 1/14; G01P 3/38; G06K 7/00
    See application file for complete search history.

(56) References Cited

U.S. PATENT DOCUMENTS

| | | |
|---|---|---|
| 1,572,940 A | 2/1926 | Legg |
| 4,387,785 A | 6/1983 | Fromm |
| 4,631,519 A | 12/1986 | Johnston |
| 4,827,203 A | 5/1989 | Sakano |
| 5,365,787 A | 11/1994 | Hernandez et al. |
| 6,084,400 A | 7/2000 | Steinich |
| 6,320,344 B1 | 11/2001 | Sakamoto et al. |
| 6,639,206 B1 | 10/2003 | Rothamel et al. |
| 7,044,004 B2 | 5/2006 | Hurley et al. |
| 8,746,605 B2 | 6/2014 | Tracey et al. |
| 2008/0276477 A1 | 11/2008 | Albrecht |
| 2010/0176283 A1* | 7/2010 | Karasik .............. G01D 5/34753 250/231.18 |
| 2013/0291629 A1 | 11/2013 | Falzarano |

(Continued)

OTHER PUBLICATIONS

PCT International Search Report and Written Opinion of the International Authority issued for PCT/US2021/030516, dated Aug. 6, 2021, 19 pages.

*Primary Examiner* — Matthew Mikels
(74) *Attorney, Agent, or Firm* — Bracewell LLP; Constance G. Rhebergen; Keith R. Derrington

(57) ABSTRACT

A recorder for documenting that a shaft in a rotating machine has been rotated while the rotating machine is stored or otherwise out of service. The recorder includes an elongated strip that is wound on a reel disposed adjacent the shaft. The reel is rotatable about an axle that is spaced away from the shaft. A free end of the strip is secured to an outer surface of the shaft and spools onto the shaft as the shaft is rotated, and which unwinds the strip from the reel. Markings are on the strip representing distance from the free end, which visually indicate occurrence and amount of shaft rotation. Types of markings include different colors or patterns, and which change at distances corresponding to shaft circumference. Alternatively, the markings are metered increments illustrating linear distance.

22 Claims, 3 Drawing Sheets

(56) References Cited

U.S. PATENT DOCUMENTS

2014/0034721 A1\* 2/2014 Gadepalli ................. G06F 8/60
 235/375
2016/0327413 A1\* 11/2016 Gregory ................... G01D 5/26
2017/0360331 A1 12/2017 Bassez et al.

\* cited by examiner

RECORDER FOR SHAFT ROTATION VERIFICATION

BACKGROUND OF THE INVENTION

1. Field of Invention

The present disclosure relates to recording rotation of a shaft of a rotating machine. More specifically, the present disclosure relates to verifying that a shaft of a rotating machine has been rotated in compliance with recommended practice.

2. Description of Prior Art

There are a number of applications for rotating machinery, such as providing rotational drive (i.e., motors and turbines), providing pressure (i.e., pumps and compressors), or providing electricity (i.e., generators). Rotating machinery used in industry, such as for manufacturing or processing, is often larger than in non-industry settings. Moreover, because many manufacturing and processing facilities are in continuous operation, these facilities often have redundant or spare rotating machinery on hand to replace rotating machinery taken out of service for maintenance or repair. When the spare rotating machinery is left dormant over a period of time, certain components sometimes deform due to creep, and moving parts can bind. Component deformation and binding of moving parts subjects the rotating machinery to failure when put into service. New equipment stored for a period of time while an industrial facility is under construction is also subject to dormancy induced failure.

Periodically rotating the shafts of rotating equipment while being stored or on stand-by is one technique employed to address the issues of the equipment being dormant. Machinery equipment shafts are rotated to preserve the shaft and avoid equipment failure from shaft sagging during equipment startup. The frequency and amount of shaft rotation is sometimes provided by the equipment manufacturer. Moreover, some manufacturer's warranties may not be honored without proof of shaft rotation. In some instances, operations or construction personnel record instances of shaft rotation that did not occur; and while not properly maintaining the dormant rotating machinery.

SUMMARY OF THE INVENTION

Disclosed herein is a recorder for use with a rotating machine having a shaft, the recorder having frame assembly made up of a base and a reel axle supported on the base. Also included with the recorder is a reel rotatably mounted on the reel axle and that is coaxial with the shaft, a strip of recording medium having a portion selectively wound onto the reel and a free end coupled to the shaft, and markings on a surface of the recording medium that reflect a distance from the free end and an amount of rotation of the shaft in the time since the free end was attached to the shaft. In an example, the rotating machine is dormant. Example markings include changes in color of a surface of the strip, and in an alternative the changes in color are disposed at a designated locations on the strip. Alternate markings are where a pattern of a surface of the strip changes, and optionally the changes in pattern are disposed at a designated locations on the strip. In one embodiment, the markings are metered indications of length. In an alternative, the frame assembly is secured to the rotating machinery by an attachment that is a coupling, such as a strap, a magnet, or combinations. Optionally, the frame assembly is disposed on a surface on which the rotating machine is supported.

Also included is a method of handling a rotating machine, and which includes engaging a recorder with a shaft of the rotating machine, monitoring rotation of the shaft while the rotating machine is dormant, estimating a value of the rotation of the shaft, recording the value of the rotation of the shaft to define a record of shaft rotation, and maintaining the record of shaft rotation. In one embodiment, the recorder includes a reel, a strip of a recording medium having a portion wound on the reel, a free end and markings that indicate a distance to the free end, and where the step of engaging a recorder involves securing the free end to an outer surface of the shaft, the method further including supporting the reel coaxial with the shaft. The step of estimating a value of rotation of the shaft optionally includes observing the markings on a portion of the strip wound onto the shaft and that are visible. In an alternative, the method also includes mounting the reel onto a reel axle, and coupling the reel axle to the rotating machine. Optionally included with the method is mounting the reel onto a reel axle, and supporting the reel axle on a surface on which the rotating machine is supported. In one example, the steps of monitoring, estimating, and recording are performed in compliance with API 686. The recorder of the method alternatively includes a digital device having a laser signal transmitter and receiver and reflectors spaced apart along a circumference of the shaft, that in one alternative are positioned 90 degrees apart from one another. Further in this example is a sensor that senses light reflected from the reflectors, and a counter for registering an output from the sensor. The counter is optionally a digital device, and in which a record of the shaft rotations is stored for proof of rotation to maintain a warranty of the rotating machine. The method optionally includes installing and operating the rotating machine.

BRIEF DESCRIPTION OF DRAWINGS

Some of the features and benefits of the present invention having been stated, others will become apparent as the description proceeds when taken in conjunction with the accompanying drawings, in which:

FIG. 1A is an elevational view of an example of a recording medium for use with the recording assembly of FIG. 1.

Figure 1:
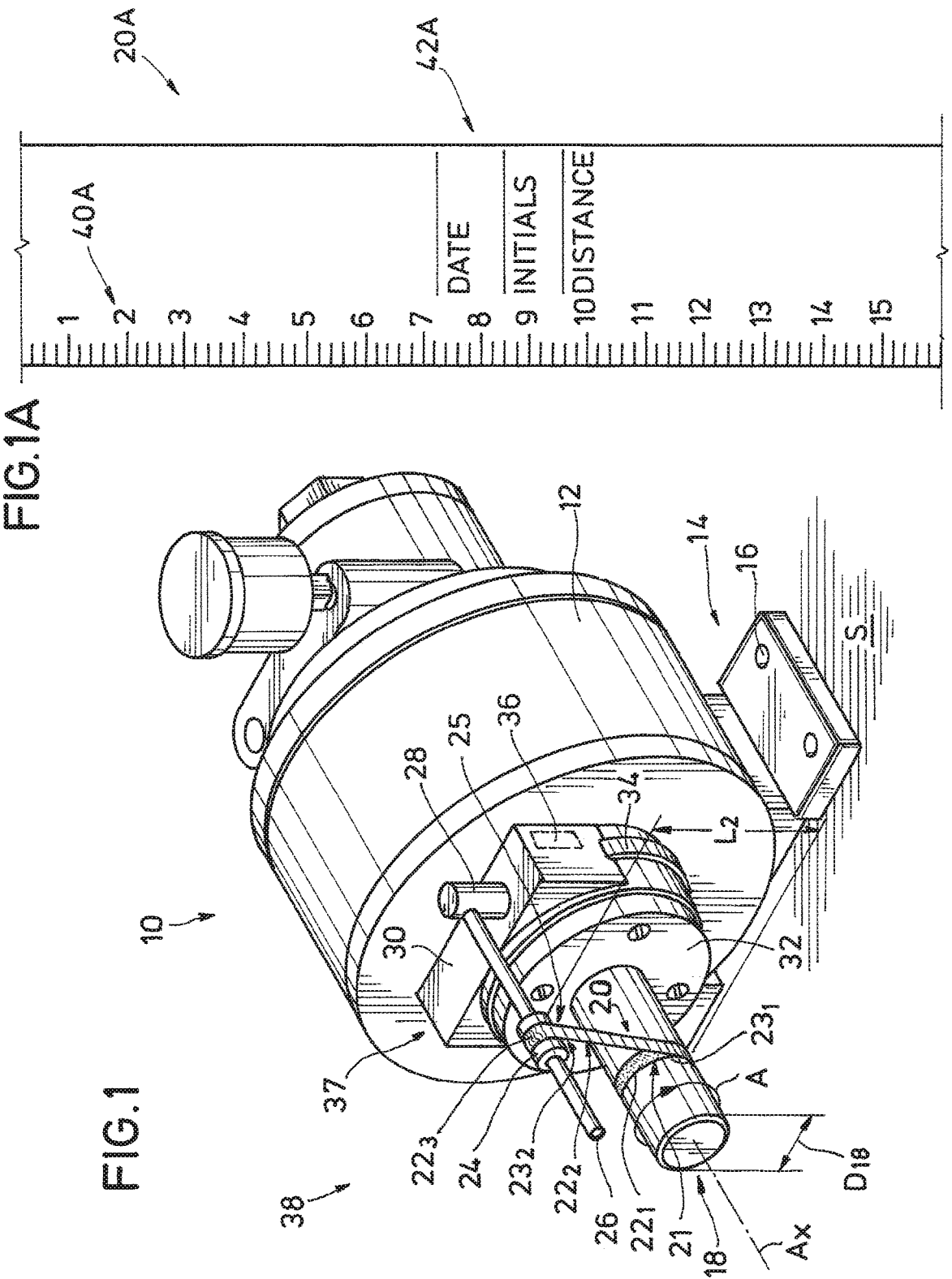
FIG. 1 is a side perspective view of a rotating machine having an example of a recording assembly for recording shaft rotation.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown.

The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in perspective view in FIG. 1 is an example of a rotating machine 10 that has an outer housing 12 for covering internal components. A base 14 is formed onto a lower portion of the housing 12, and includes bolt holes 16 through which fasteners (not shown) are selectively inserted for securing the rotating machine 10 to a mounting surface S. Rotating machine 10 includes a shaft 18 shown projecting axially from within housing 12. A strip of recording medium 20 is shown having a free end 21 secured to an outer surface of the shaft 18. Example securing means include glue, adhesive tape, and fasteners (not shown). The strip of recording medium 20 is partitioned into segments $22_1$, $22_2$, $22_3$ which are visually distinguishable from one another by markings on each of the segments $22_1$, $22_2$, $22_3$ that differ from markings on adjacent ones of the segments $22_1$, $22_2$, $22_3$. Example markings include a particular color or pattern. It should be pointed out that embodiments of the strip of recording medium 20 include those having more than three segments. As shown in FIG. 1, segment $22_2$ extends along a path that is substantially straight and with a callout identifying its length $L_2$. Segment $22_1$ is shown spooled on shaft 18 and extending along a curved path; in the embodiment shown segment $22_1$ has a length substantially equal to the circumference of shaft 18 and based on diameter $D_{18}$ of shaft 18. As described in more detail below, segments $22_1$, $22_2$, $22_3$ of some embodiments of the strip of recording medium 20 have a designated length so that a distance from a portion of the strip of recording medium 20 to the free end 21 is identifiable by inspecting markings on the strip of recording medium 20 that are visible. As described in more detail below, in one example a distance from the free end 21 to visible portions of the strip of recording medium 20 provides an indication of the amount shaft 18 has rotated since the free end 21 was secured to the shaft 18. Alternatives exist where a strip of recording medium 20 has segments $22_1$, $22_2$, $22_3$ with lengths that differ from lengths of segments $22_1$, $22_2$, $22_3$ of other embodiments of the strip of recording medium 20. In the example of FIG. 1, borders $23_1$, $23_2$ are optionally included on strip 20 to illustrate respective interfaces between segments $22_1$, $22_2$ and segments $22_2$, $22_3$.

Still referring to FIG. 1, an example of a reel 24 is illustrated on which a reserve portion 25 of the strip 20 is spooled. Reel 24 is shown rotatingly mounted on a reel axle 26. In the embodiment shown, reel axle 26 is an elongated member and oriented substantially parallel with an axis $A_X$ of shaft 18. One end of reel axle 26 is attached to a pedestal 28, so that reel axle 26 is supported in a cantilever like arrangement on pedestal 28. As shown, pedestal 28 has a cylinder like configuration and about an axis oriented perpendicular with reel axle 26. An end of pedestal 28 distal from its portion attached to reel axle 26 is mounted on an upper surface of a base 30. Upper surface of base 30 is rectangular with its elongate side perpendicular to axis $A_X$. Upper and side surfaces of base 30 are substantially planar, and its lower surface is curved to give base 30 a saddle like configuration. In the example of FIG. 1, a portion of housing 12 that circumscribes shaft 18 projects axially outward to define a cylindrically shaped end plate 32, and on which base 30 couples to rotating machine 10. As shown, the curved lower surface of base 30 corresponds to curved lateral sidewalls of the end plate 32. An example means of securing the base 30 to the rotating machine 10 includes a strap 34 with opposing ends attached to lateral sides of the base 30. In between where its ends attach to the lateral sides of base 30 strap 34 extends along the outer surface of the end plate 32. An alternative means to secure base 30 to rotating machine 10 includes a magnet 36, and which is shown in dashed outline. In an alternative, the base 30, pedestal 28, and reel axle 26 define a support frame 37, and a recording assembly 38 is defined by the support frame 37, reel 24, and strip of recording medium 20.

In a non-limiting example of operation, recording assembly 38 is coupled to rotating machine 10; such as by securing strap 34 to end plate 32 or by attractive forces of magnet 36. Alternatively, instead of being coupled to rotating machine 10 recording assembly 38 is optionally supported on surface S; such as being set directly on surface S or on a stand or frame (not shown) set on surface S. Free end 21 of strip of recording medium 20 is secured to shaft 18 and a portion of strip of recording medium 20 spans between reel 24 and shaft 18. In the example of FIG. 1, shaft 18 has rotated (as illustrated by arrow A) so that a portion of strip of recording medium 20 is wound around shaft 18. In one alternate example, lengths of the segments $22_1$, $22_2$, $22_3$ is a criteria for selecting a particular strip of recording medium 20; that is the segments $22_1$, $22_2$, $22_3$ of the strip of recording medium 20 have lengths corresponding to the circumference of shaft 18. Examples of the lengths corresponding to the circumference of the shaft 18 are where the length of each of the segments $22_1$, $22_2$, $22_3$ ("segment lengths") equals the circumference. An optional selection criteria is that a ratio of the circumference to segment lengths is an integer value, or its reciprocal is an integer value. For example, by selecting a recording medium 20 with segment lengths corresponding to the circumference of shaft 18, a number of rotations of the shaft 18 since the free end 21 was attached can be readily obtained based on the visible color and/or pattern in combination with a knowledge of a color and/or pattern sequence of the segments $22_1$, $22_2$, $22_3$. In an example, the configuration or position of the strip of recording medium 20 when monitoring and/or recording rotation of shaft 18 begins or is initiated ("initial position") is with the free end 21 being secured to shaft 18, and none of the strip of recording medium 20 being wound onto the shaft 18. Alternatives exist where the initial configuration is set to be after at least a portion of the strip of recording medium 20 has been spooled onto the shaft 18, such as that shown in FIG. 1.

One advantage of the disclosed device and method is that clear physical evidence that the shaft 18 has been rotated is realized by observing a difference in the amount of the strip of recording medium 20 that is wrapped around or spooled onto the shaft 18 versus the initial position. In another alternative, the frequency of rotation of the shaft 18 and the amount of rotation is performed in compliance with API 686. In an example, based on records obtained and maintained with the recording assembly 38 that the shaft 18 has been rotated, along with the amount and frequency of rotation during the period of time the rotating machine 10 was dormant and/or out of operation, the rotating machine 10 is deemed to be ready for operation and is placed in service.

Referring now to FIG. 1A, an alternate example of a strip of recording medium 20A is shown having markings that are in the form of increments 40A. The increments 40A are illustrated as lines extending perpendicular to a length of the strip of recording medium 20A and spaced apart from one another. Examples exist where the increments 40A are equidistant spaced apart from one another, and the respective distances are in SI or English units. Further in the example of FIG. 1A is a verification field 42A in which a date, initials, and distance are to be physically input, such as by operations personnel. An example input in the verification field 42A logs a distance of the strip of recording medium 20A spooled onto the shaft 18A, the date the distance was observed, and initials of the observer. In one example, a log of information in the verification field 42A provides evidence of compliance with API 686.

Figure 2:
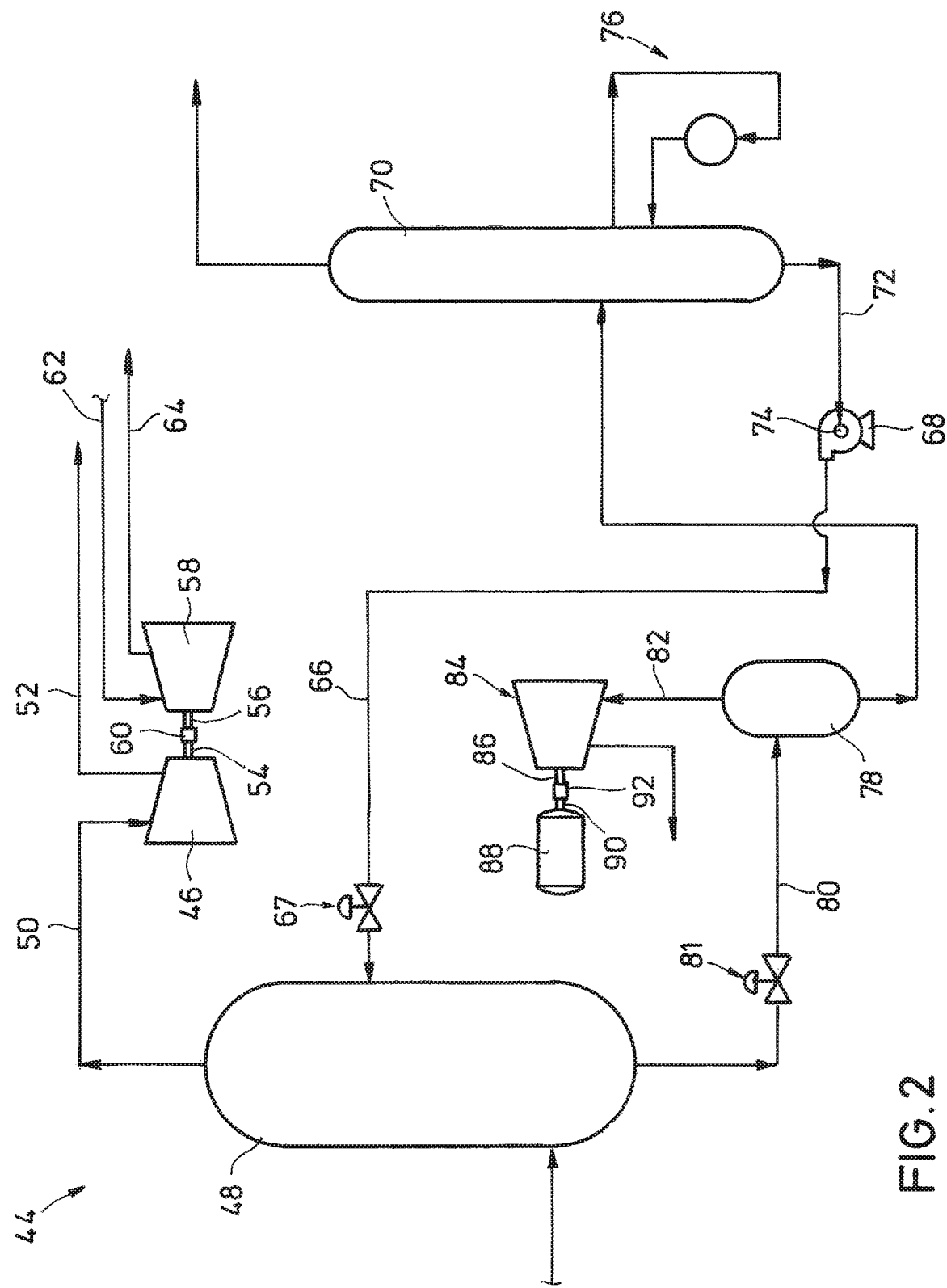
FIG. 2 is a schematic example of a facility employing embodiments of a rotating machine.

Shown schematically in FIG. 2 is an example of a processing facility 44 in which embodiments of the rotating machine 10 of FIG. 1 are installed and in operation. Shown is a compressor 46 that pressurizes vapor or gas received from a vessel 48 through a line 50. The vapor or gas is pressurized in compressor 46 and discharged into line 52. Impellers or blades (not shown) in compressor 46 are rotated by driving an attached shaft 54 with a shaft 56 from a turbine 58. A coupling 60 is shown engaging shafts 54, 56. In an example, coupling 60 includes a gearbox. A line 62 is shown that provides a motive fluid to turbine 58 to rotate blades or impellers (not shown) inside turbine 58 and that result in rotation of its shaft 56. The motive fluid is discharged from turbine 58 through line 64. A reflux fluid is delivered to vessel 48 through line 66, and which partially flashes across a control valve 67 in line 66. Pump 68 pressurizes liquid received from tower 70 via line 72, and discharges the pressurized liquid into line 66. A shaft 74 is shown in dashed outline in pump 68. Optionally, a reboiler circuit 76 is included with tower 70. Further illustrated in FIG. 2 is a tank 78 that receives a flow of liquid bottoms from vessel 48 and through line 80. An optional control valve 81 in line 80 provides a pressure drop for flashing a portion of the liquid bottoms so that a two phase flow is delivered to tank 78. Gas flowing into tank 78 through line 80 is directed into an overhead line 82 that directs the gas to a compressor 84. Rotating a shaft 86 of compressor 84 compresses the gas. A motor 88 is shown having a shaft 90 that engages shaft 86 via a coupling 92. In an alternative, energizing motor 88 rotates shaft 90, coupling 82, and shaft 86. Compressor 46, turbine 58, coupling 60, pump 68, compressor 84, motor 88, and coupling 92 are each an example of a rotating machine.

Figure 3:
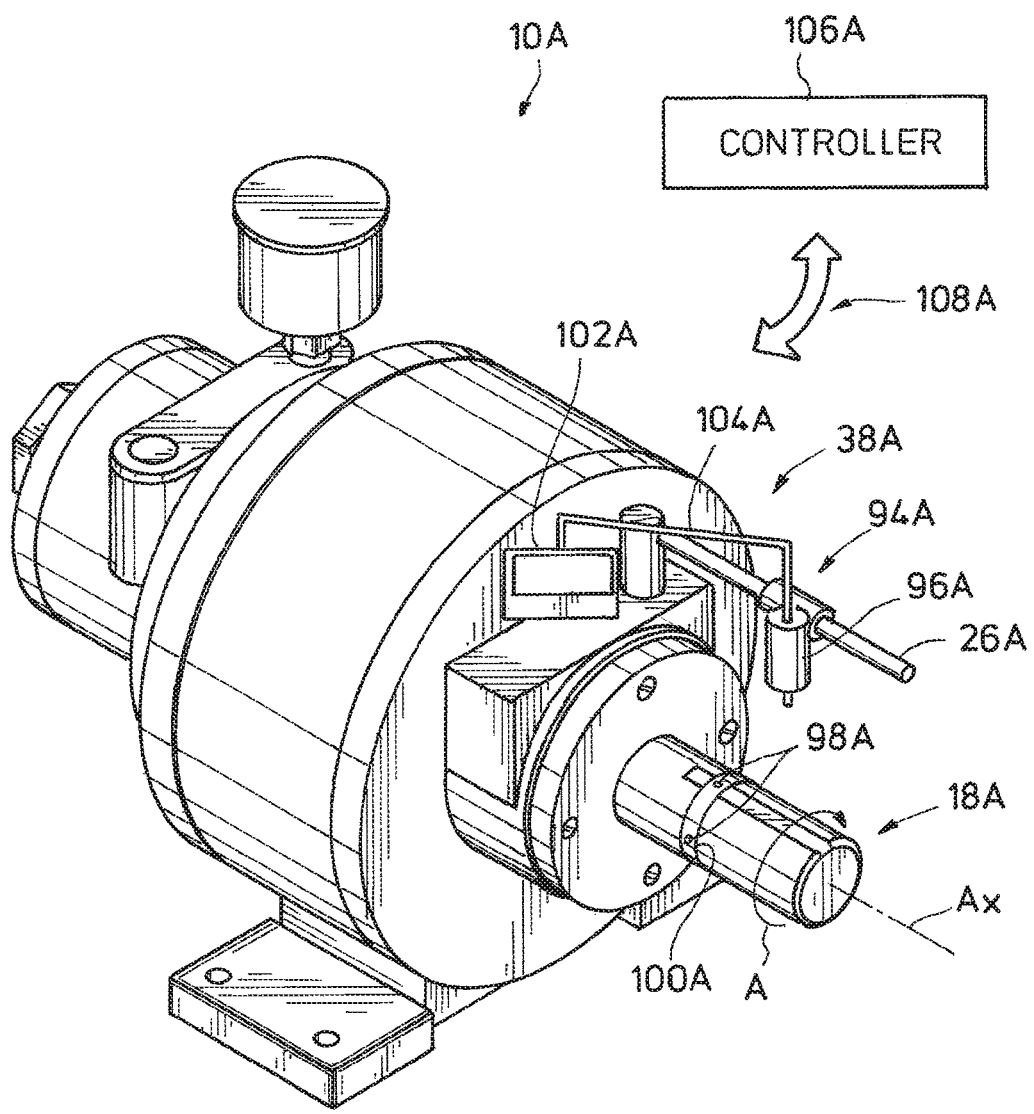
FIG. 3 is side perspective view of a rotating machine having an alternate example of a digital recording assembly for recording shaft rotation.

Shown in perspective view in FIG. 3 is an alternate example of a recording assembly 38A for use with a rotating machine 10A. A counter system 94A is included with the recording assembly 38A, which is equipped with a sensor 96A and reflectors 98A arranged on a band 100A shown mounted to an outer surface of shaft 18A. Sensor 96A of this example is responsive to light reflected from reflectors 98A. In the example shown, the reflectors 98A are spaced angularly away from each other along a path that circumscribes shaft 18A. Alternatively, reflectors 98A are each at substantially the same axial location on axis $A_X$ of shaft 18A. In an example, sensor 96A is strategically positioned to sense light reflected from a one of the reflectors 98A that are at a particular angular location about axis $A_X$. For the purposes of illustration herein, each time light from a particular reflector 98A is sensed by sensor 96A is referred to as an event. Further in this example, rotating the shaft 18A as shown by arrow A consequently moves the reflectors 98A about axis $A_X$ to the particular angular location and reflect light that is sensed by sensor 96A. A counter 102A is also included with the recording assembly 38A and which is in communication with sensor 96A through a communication line 104A. A screen on counter 102A optionally displays a record of the number of rotations. In an alternative, sensor 96A emits a signal for each event of sensed reflected light, and which is tabulated in counter 102A. An optional controller 106A is also shown with the example of FIG. 3, and that is in communication with the recording assembly 38A via communication means 108A. Examples of communication line 104A and communication means 108A include a conductive medium, fiber optic material, and wireless. The number and/or time of each event is optionally stored in counter 102A, in controller 106A, or both. In an alternative, recording assembly 38A includes a light emitter (not shown) which directs light towards the reflectors 98A that when reflected is sensed by sensor 96A. In an example of operation of recording assembly 38A (similar to operation of recording assembly 38 of FIG. 1 and described above) is coupled with rotating machine 10A over a period of time when rotating machine 10A is out of service and information of rotation collected and maintained within the recording assembly 38A is consulted prior to operation of rotating machine 10A. In an alternate embodiment equipment data, date and/or time of rotation, and identity of operations personnel performing the rotation are displayed on screen of counter 102A. In a non-limiting example, name of operations personnel performing the rotation and equipment information (i.e. equipment number, serial number, etc.) are entered into the recording assembly 38A; and which are optionally stored digitally such as on a computer readable medium.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A recorder for use with a rotating machine the recorder comprising:
   the rotating machine comprising,
      a shaft,
      a housing, and
      a cylindrically shaped end plate that projects from a lateral side of the housing and that circumscribes the shaft; and
   a frame assembly comprising,
      a base having a lower surface configured complementary to an upper surface of the end plate, and
      a reel axle supported on the base;
   a reel rotatably mounted on the reel axle and that is coaxial with the shaft;

a strip of recording medium having a portion selectively wound onto the reel and a free end coupled to the shaft;

markings on a surface of the recording medium that reflect a distance from the free end and that visually indicates occurrence and an amount of rotation of the shaft in the time since the free end was attached to the shaft; and a pedestal mounted on an upper surface of the base, and the pedestal mounted to an end of the reel axle, so that when the reel is mounted to the reel axle and the strip is attached to the shaft, visible markings on the strip indicate the amount of shaft rotation.

2. The recorder of claim 1, wherein the rotating machine is dormant.

3. The recorder of claim 1, wherein the markings comprise changes in color of a surface of the strip.

4. The recorder of claim 3, wherein the changes in color are disposed at a designated location on the strip.

5. The recorder of claim 1, wherein the markings comprise changes of a pattern of a surface of the strip.

6. The recorder of claim 5, wherein the changes in pattern are disposed at a designated locations on the strip.

7. The recorder of claim 1, wherein the markings comprise metered indications of length.

8. The recorder of claim 1, wherein the frame assembly is secured to the rotating machinery by an attachment that comprises a coupling selected from the group consisting of a strap, a magnet, and combinations thereof.

9. The recorder of claim 1, wherein the frame assembly is disposed on a surface on which the rotating machine is supported.

10. A method of handling rotating machine comprising:
engaging a recorder with a shaft of the rotating machine;
monitoring rotation of the shaft while the rotating machine is dormant;
estimating a value of the rotation of the shaft;
recording the value of the rotation of the shaft to define a record of shaft rotation; and
maintaining the record of shaft rotation.

11. The method of claim 10, wherein the recorder comprises a reel, a strip of a recording medium having a portion wound on the reel, a free end and markings that indicate a distance to the free end, and where the step of engaging a recorder comprises securing the free end to an outer surface of the shaft, the method further comprising supporting the reel coaxial with the shaft.

12. The method of claim 11, wherein the step of estimating a value of rotation of the shaft comprises observing the markings on a portion of the strip wound onto the shaft and that are visible.

13. The method of claim 11, further comprising mounting the reel onto a reel axle, and coupling the reel axle to the rotating machine.

14. The method of claim 11, further comprising mounting the reel onto a reel axle, and supporting the reel axle on a surface on which the rotating machine is supported.

15. The method of claim 11, wherein the steps of monitoring, estimating, and recording are performed in compliance with API 686.

16. The method of claim 11, wherein the recorder comprises a reflector, sensor that senses light reflected from the reflector, and a counter for registering an output from the sensor.

17. The method of claim 11, further comprising installing and operating the rotating machine.

18. The recorder of claim 1, wherein the strip of recording medium is partitioned into segments that are visually distinguishable from one another by markings on each of the segments that differ from markings on adjacent ones of the segments, and wherein a length of one of the segments is substantially equal to a circumference of the shaft.

19. The recorder of claim 18, wherein one of the segments has a designated length so that a distance from a portion of the strip of recording medium to the free end of the strip is visually identifiable by inspecting the markings on the strip of recording medium.

20. The recorder of claim 19, wherein the distance from the free end of the strip to visible portions of the strip of recording medium provides a visual indication of the amount shaft has rotated since the free end was secured to the shaft.

21. The recorder of claim 18, wherein lengths of each of the segments are substantially the same as a circumference of the shaft, so that in the time since the free end was attached a number of rotations of the shaft can be readily obtained based on a visible color or pattern in combination with a knowledge of a color and/or pattern sequence of the segments.

22. The recorder of claim 1, wherein the rotating machine comprises fluid handling equipment selected from the group consisting of a compressor, a turbine, a coupling, and a pump.

* * * * *